(12) United States Patent
Huang et al.

(10) Patent No.: US 11,374,739 B2
(45) Date of Patent: Jun. 28, 2022

(54) METHODS OF PROVING THE IMMUTABILITY OF DIGITAL RECORDS

(71) Applicant: Digital Transaction Limited, Hong Kong (CN)

(72) Inventors: Ian Yuan Yuan Huang, Hong Kong (CN); Eric Zhiqiang Ma, Hong Kong (CN)

(73) Assignee: Eternal Paradise Limited, Mahe (SC)

( * ) Notice: Subject to any disclaimer, the term of this patent is extended or adjusted under 35 U.S.C. 154(b) by 217 days.

(21) Appl. No.: 16/739,088

(22) Filed: Jan. 9, 2020

(65) Prior Publication Data

US 2021/0218549 A1 Jul. 15, 2021

(51) Int. Cl.
| | | |
|---|---|---|
| *H04L 29/06* | (2006.01) | |
| *H04L 9/06* | (2006.01) | |
| *G06F 21/60* | (2013.01) | |
| *H04L 9/30* | (2006.01) | |
| *H04L 9/32* | (2006.01) | |

(52) U.S. Cl.
CPC .......... *H04L 9/0637* (2013.01); *G06F 21/602* (2013.01); *H04L 9/30* (2013.01); *H04L 9/3242* (2013.01); *H04L 2209/38* (2013.01)

(58) Field of Classification Search
None
See application file for complete search history.

(56) References Cited

U.S. PATENT DOCUMENTS

| 10,419,209 | B1 | 9/2019 | Griffin et al. | |
|---|---|---|---|---|
| 2017/0046689 | A1* | 2/2017 | Lohe | G06Q 20/40 |
| 2018/0150799 | A1 | 5/2018 | Hunt et al. | |
| 2019/0156429 | A1* | 5/2019 | Beckmann | G06Q 20/3827 |
| 2019/0281066 | A1* | 9/2019 | Simons | H04L 9/3226 |
| 2020/0344062 | A1* | 10/2020 | Haldar | H04L 9/0825 |
| 2020/0394619 | A1* | 12/2020 | Afaneh | G06Q 20/0655 |

FOREIGN PATENT DOCUMENTS

WO    WO-2018224431 A   * 12/2018   ............. G06Q 10/00

OTHER PUBLICATIONS

European Patent Office, Communication, Extended European Search Report issued for European Application No. 21150794.2, dated May 18, 2021, 9 pages.

* cited by examiner

*Primary Examiner* — Andrew J Steinle
(74) *Attorney, Agent, or Firm* — Norton Rose Fulbright US LLP

(57) ABSTRACT

One example embodiment is a method of proving the immutability of digital records in a first entity. The method includes storing the digital records in a sequence of blocks by the first entity; regularly sending the hash value of the blocks by the first entity to the external party; computing a re-computed hash value of a specific block from the digital records stored at the first entity by a second entity; obtaining a retrieved hash value of the specific block from the external party by mapping a key index by the second entity; and proving that the digital records have not been changed up to the specific block if the re-computed hash value is the same as the retrieved hash value by the second entity.

20 Claims, 6 Drawing Sheets

METHODS OF PROVING THE IMMUTABILITY OF DIGITAL RECORDS

FIELD OF INVENTION

This invention relates to methods of proving the immutability of digital records.

BACKGROUND OF INVENTION

In many multi-party legal and commercial transactions, it is paramount for one party to verify that the records kept by the other party has not been secretly changed without notification. This becomes a pressing issue in the digital economy where a transaction may involve multiple external unknown, parties geographically far away and under different legal jurisdictions. Hence an advanced method for proving the immutability of digital records is called for.

SUMMARY OF INVENTION

One example embodiment is a method of proving the immutability of digital records in a first entity. The method includes storing the digital records in a sequence of blocks by the first entity; regularly sending at least one hash value by the first entity to at least one external party; computing a re-computed hash value of a specific block from the digital records stored at the first entity by a second entity; obtaining a retrieved hash value of the specific block from the at least one external party by mapping a key index by the second entity; and proving that the digital records have not been changed up to the specific block if the re-computed hash value is the same as the retrieved hash value by the second entity. Each block has a hash value computed from a content of a current block and all its previous blocks. The key index corresponds to the specific block in the sequence of blocks in the first entity.

Another example embodiment is a method of verifying that digital records stored in a sequence of blocks in a first entity are truly non-modified. Each block has a hash value computed from a content of a current block and all its previous blocks. The method includes regularly sending at least one hash value by the first entity to at least one external party; computing a re-computed hash value of a specific block from the digital records stored at the first entity by a second entity; obtaining a retrieved hash value of the specific block from the at least one external party by mapping a key index by the second entity; and verifying that the digital records is truly non-modified up to the specific block if the re-computed hash value is the same as the retrieved hash value by the second entity. The key index corresponds to the specific block in the sequence of blocks in the first entity.

In another example embodiment, the present invention is an authentication system that proves digital records stored in a sequence of blocks in a first entity are truly non-modified. The system includes a data storage system, at least one external data storage system, a processor and a memory storing instructions and in electronic communication with the processor. The data storage system stores the sequence of blocks in a first entity. Each block has a hash value computed from a content of a current block and all its previous blocks. The at least one external data storage system receives and stores at least one hash value of the sequence of blocks sent from the data storage system in the first entity and allows a second entity to obtain a retrieved hash value by mapping a key index. The key index corresponds to a specific block in the sequence of blocks in the first entity. The processor is configured to execute the instructions to compute a re-computed hash value of the specific block from the digital records stored at the first entity. If the re-computed hash value of the specific block is the same as the retrieved hash value, the digital records stored in the sequence of blocks in the first entity are truly non-modified.

Other example embodiments are discussed herein.

DETAILED DESCRIPTION OF THE PREFERRED EMBODIMENTS

Figure 1:
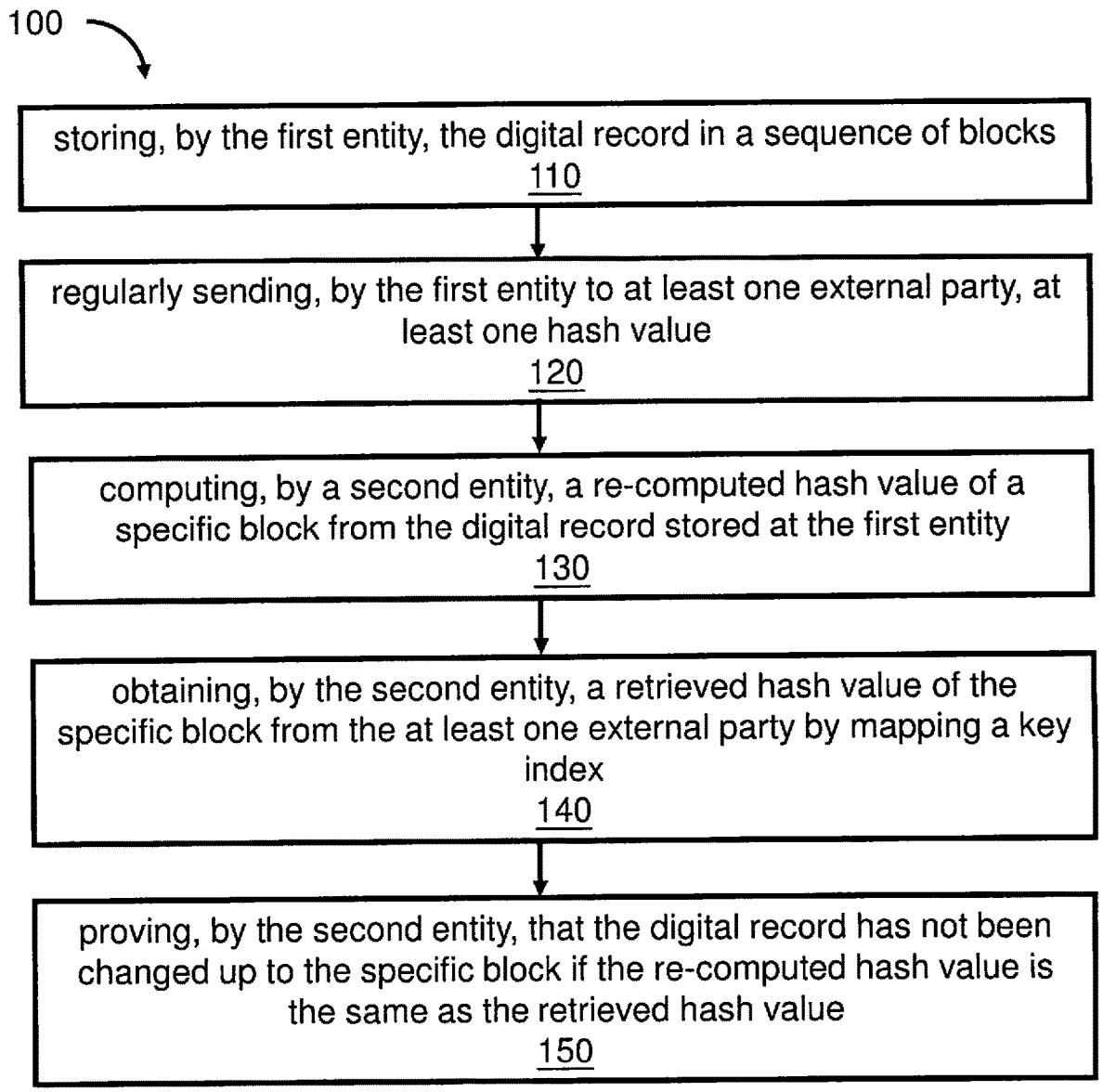
FIG. 1 shows a method of proving the immutability of digital records in a first entity in accordance with an example embodiment.

As used herein and in the claims, "comprising" means including the following elements but not excluding others.

As used herein and in the claims, "digital records" means a plurality of chunks or blocks of digital data that stores information. The "latest digital record" is stored in a block appended to the end of the blocks of digital records. In one embodiment, the "digital records" are arranged in a sequence of blocks.

As used herein and in the claims, "hash pointer" means the hash value of the previous block.

As used herein and in the claims, the "entity" can be an individual, a company, an organization, a team, a department, or any party that practices the present invention.

Example embodiments of the present invention provide a reliable and efficient method for verification of the immutability of digital records.

To prove that the content of digital records A has not been changed can be achieved by seeking a function $f$ that maps A to $h=f(A)$ with the property that if A is changed to A', then $f(A')$ is changed to h' where h and h' are different. This is referred here as the "collision free" property. Another more important property of $f$ is that, giving an h, it is extremely hard and costly to find an M so that $f(M)=h$. This is the "hiding" property. A cryptographic hash function satisfies these two properties. As such, we can prove the immutability of digital records A if the hash value h generated by the hash function is the same as the one generated before.

In an example embodiment, the digital records are arranges in blocks, i.e. $A_0, A_1, \ldots, A_n$. We compute $\{h_0, h_1, h_2, \ldots, h_n\}$ as follows:

$$h_0 = f(A_0)$$

$$h_1 = f(A_0, A_1)$$

$$h_2 = f(A_0, A_1, A_2)$$

$$h_n = f(A_0, A_1, A_2, \ldots, A_n)$$

Then $h_n$ can be used to prove the immutability of the digital records $\{A_0, A_1, A_2, \ldots, A_n\}$. In a further embodiment, a first entity computes the hash values $\{h_0, h_1, h_2, \ldots, h_n\}$ from $\{A_0, A_1, A_2, \ldots, A_n\}$ as mentioned above; and regularly send some or all these hash values to one or more external parties. When a second entity wants to verify whether the digital records are the same as before, the second entity can (1) re-compute these hash values from the blocks of digital records stored in the first entity, and (2) compare these re-computed hash values with those retrieved from the external party. If the hash values agree, then the second entity can ascertain that the blocks of digital records have not been altered up to the last block $A_n$.

In an example embodiment, computing the hash value $h_n$ can be further simplified in the following manner:

$$h_n = f(B_n)$$

where $B_n = g(h_{n-1}, A_n)$ for $n \geq 1$

Here, we first augment the content of $A_n$ with the hash value of the previous block $h_{n-1}$, and then apply a function g onto the augmented content $B_n$. g can been any function. In one embodiment, it is a 'pass-through' function without performing any transformation to $\{h_{n-1}, A_n\}$. In another embodiment, it can be the digital signature of $\{h_{n-1}, A_n\}$.

In the above embodiment, each augmented block $B_n$ stores the hash value $h_{n-1}$ of the previous block; and hence the blocks $\{B_0, B_1, B_2, \ldots, B_n\}$ are linked together and form a chain hereafter referred to as a blockchain. As the calculation of $h_n$ is based on the content of $A_n$ only but not the previous blocks, the computation cost of constructing a new block is only relative to the size of $A_n$ instead of all the blocks before and including $A_n$.

In an exemplary application, many parties participate to a project, a product to be manufactured, or a sales event. These parties may be a government organization, a company, or a department or office within a multi-national corporation. Together they form a community for this project, product or the sales event. Within this community, each party may create its own blockchain to store their own digital records, or they may share one or more blockchains created by others. As each party needs not trust each other, they may want to examine from time to time whether the digital content of the other party is truly not altered after its creation. This invention provides a simple and effective way to achieve this goal. In the following discussion, we use company, party and entity interchangeably to denote that they are members of the community that can access the blockchains created by its members.

In the present invention, the entity that holds a blockchain which contains the digital records may not need to send a copy of the blockchain to other entities for verification, yet other entities can still be ascertained that the digital records have not been modified. Thus, the digital records can be kept private, and it can still be proved to be truly non-modified, as discussed below.

Example embodiments of the present invention do not require adding other steps, parties, systems or networked peers into the blockchain updating process' critical path. Here the critical path is the continuous steps pathway in the system for handling a record updating request from the start to the end, which decides the overall handling time for updating the record. The overall system performance can be much improved since no network communication nor consensus between the parties is needed.

Example embodiments of the present invention can handle large size of digital records.

Referring now to FIG. 1, an example embodiment is a method 100 of proving the immutability of digital records stored in a first entity.

Block 110 shows storing the digital records in a sequence of blocks by the first entity. By way of example, each block has a hash value computed from a content of a current block and all its previous blocks.

Block 120 shows regularly sending at least one hash value by the first entity to at least one external party.

By way of example, the at least one external party stores the at least one hash value sent from the first entity. The at least one external party may be a public media such as a newspaper or a web-content, a public blockchain and a permissive blockchain which can be read by the general public.

By way of example, the at least one external party stores the at least one hash value sent from the first entity in a permissive blockchain, in which the at least one external party controls a read permission of the permissive blockchain.

Block 130 shows computing a re-computed hash value of a specific block from the digital records stored at the first entity. By way of example, the specific block is one of the blocks in the sequence of blocks and has a hash value stored at the external party.

By way of example, a second entity instructs the first entity to compute the re-computed hash value.

By way of example, the second entity computes the re-computed hash value by copying the sequence of block from the first entity to its own storage facility.

By way of example, the first entity computes the re-computed hash value under the supervision of the second entity or other entity's.

By way of example, the re-computed hash value of the specific block is computed from a genesis block of the sequence of blocks stored at the first entity. The genesis block is the first block of the sequence of blocks.

By way of example, the re-computed hash value of a specific block is computed from an intermediate block of the sequence of blocks stored at the first entity, in which the digital records have been proved to be truly non-modified up to the intermediate block, and the intermediate block is a block between a genesis block and the specific block in the sequence of blocks.

Block 140 shows obtaining, by the second entity, a retrieved hash value of the specific block from the at least one external party by mapping a key index. By way of example, the key index corresponds to the specific block in the sequence of blocks in the first entity and the retrieved hash value is the hash value stored at the external party. In one embodiment, the key index is actually the index of a block in the sequence of blocks, for example, the $1201^{th}$ block of the sequence of blocks. As such, the second entity specifies a key index for the external party to retrieve the hash value. In an example embodiment, the external party maps the key index to a location in its data storage system that stores all the hash values sent by the first entity in order to retrieve the desired hash value.

By way of example, the at least one external party exposes the stored at least one hash value to the general public, so the second entity can obtain the retrieved hash value of the specific block.

By way of example, the at least one external party maintains at least one private/public key pair, and encrypts the at least one hash value sent from the data storage system with one of its private key that the external party maintains to generate at least one encrypted hash value.

By way of example, the at least one external party provides the public key for the first entity or the second entity to decrypt the at least one encrypted hash value to provide the retrieved hash value.

By way of example, the at least one external party maintains at least one private/public key pair, and signs the at least one hash value sent from the data storage system with one of its private key that the external party maintains to generate at least one signed hash value.

By way of example, the at least one external party provides the public key for the first or the second entity to verify the at least one signed hash value to provide the retrieved hash value.

Block 150 shows proving that the digital records have not been changed up to the specific block if the re-computed hash value is the same as the retrieved hash value.

By way of example, the second entity verifies that the digital records are truly non-modified up the specific block by comparing the re-computed hash value and the retrieved hash value. If the values agree, the second entity can declare that the digital records are truly non-modified up the specific block.

By way of example, the first entity proves that the digital records are truly non-modified up the specific block by comparing the re-computed hash value and the retrieved hash value. If the values agree, the first entity can declare that the digital records are truly non-modified up the specific block.

In one embodiment, the re-computed hash value and the retrieved hash value are conducted at the computing facility of the second entity. In another embodiment, they are conducted at the computing facility of the first entity and the results are sent to the second entity.

Figure 2:
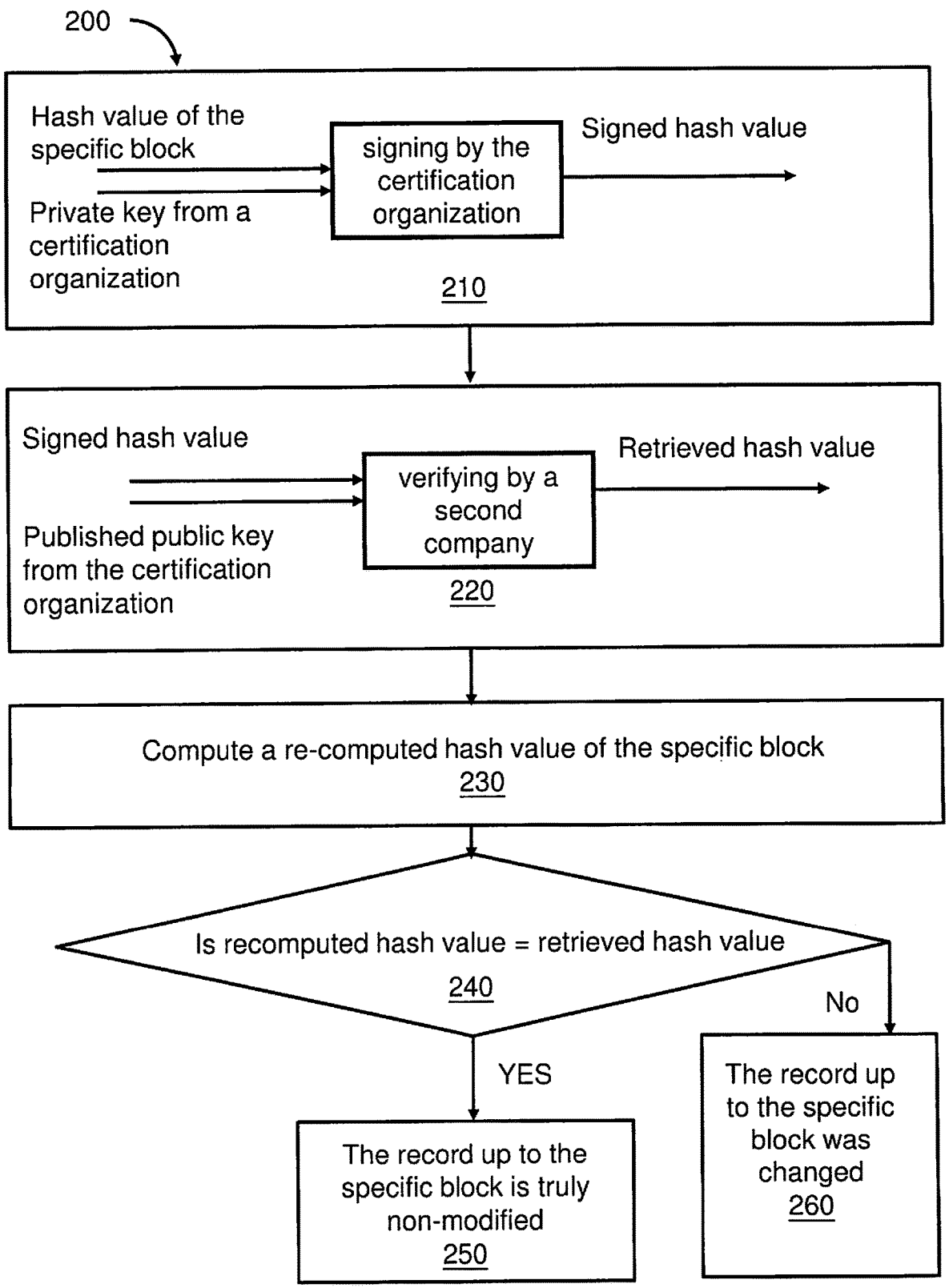
FIG. 2 shows a method of proving the immutability of digital records in accordance with an example embodiment.

Referring now to FIG. 2, another example embodiment shows a method 200 of verifying a transaction record stored in a chain of blocks in a first company is truly non-modified. The transaction record of the first company is stored in the chain of blocks and the hash values of the blocks are regularly sent to a certification organization in a pre-determined period. For example, the pre-determined period can be every hour, every day, every Sunday at mid-night, or every month. The certification organization receives and signs the hash values of the blocks with its private key to generate signed hash values. The certification organization may publish the signed hash values and its public key to a general public. When a second company wants to verify the transaction records of the first company, the second company obtains the public key from the certification organization and verifies the signed hash values with the public key to obtain the retrieved hash values. By way of example, for verifying the latest transaction record of the first company in step 210, the first company sends the last block in the chain of blocks to the certification organization. This last block is regarded as the specific block in this instance. The certification organization then signs the hash value of this block with the private key. Block 220 shows that the second company obtains a retrieved hash value which corresponds to the hash value of the specific block of the first company by verification digital signature of the hash value are correct with the public key. Block 230 shows that the second company re-computes a re-computed hash value from a genesis block of the chain of the blocks up to the specific block. Block 240 shows that the second company compares the re-computed hash value and the retrieved hash value. Block 250 shows the transaction record up to the specific block is truly non-modified if the values are the same. Block 260 shows the transaction record up to the specific block was changed if the values are different.

By way of example, the hash value of the specific block can be signed by more than one certification organizations. When the second company wants to verify the immutability of the transaction record, it obtains the retrieved hash value respectively from each of the more than one certification organizations and further verifies whether all the retrieved hash values are consistent. If all the values are consistent, the second company determines that the retrieved hash values are trustworthy.

Figure 3:
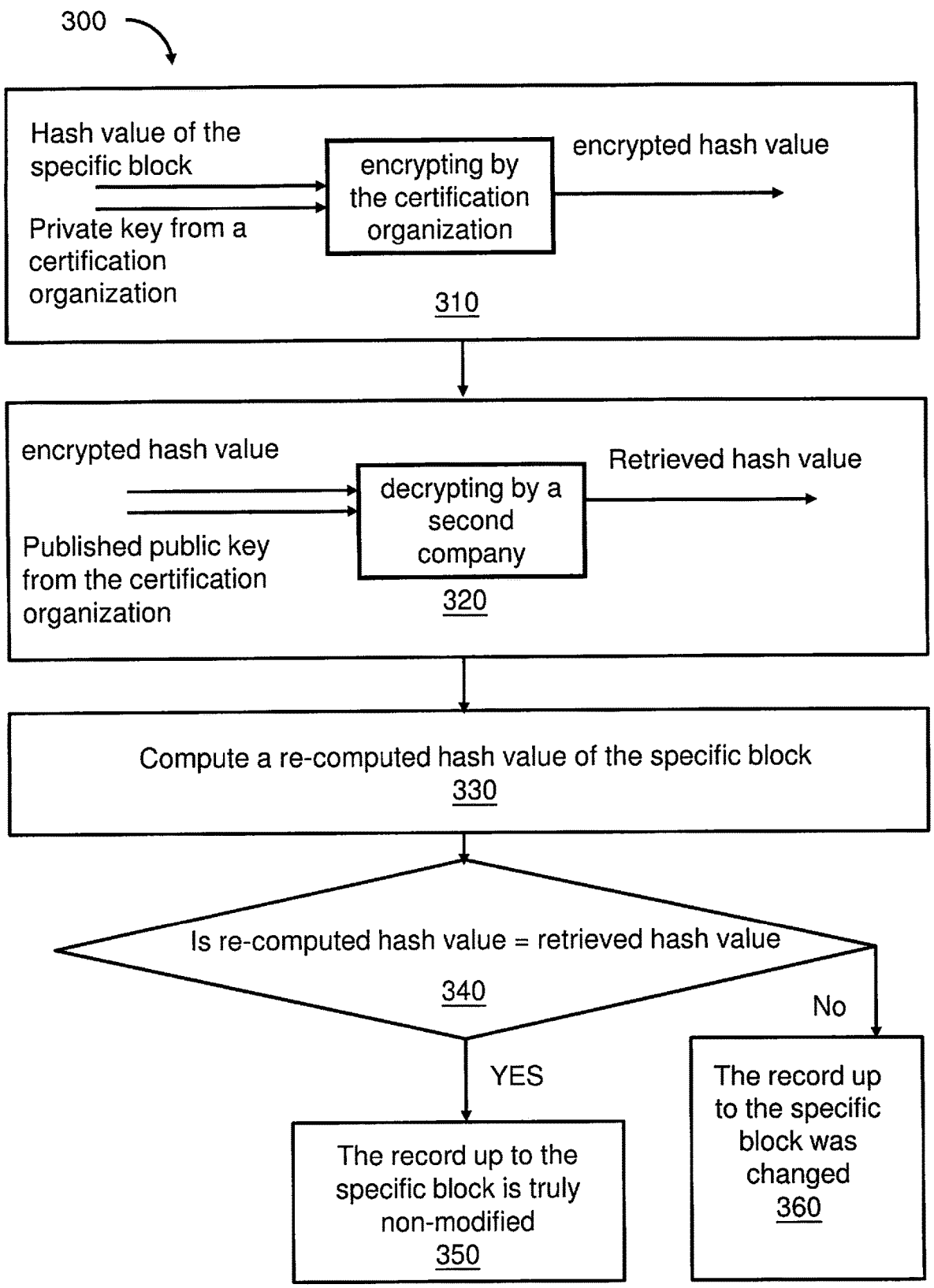
FIG. 3 shows a method of proving the immutability of digital records in accordance with an example embodiment.

Referring now to FIG. 3, another example embodiment shows a method 300 of verifying a delivery record stored in a link of blocks in a first company is truly non-modified. The delivery record of the first company is stored in the link of blocks and the hash values of the blocks are regularly sent to a certification organization in a pre-determined period. For example, the pre-determined period can be a day, a month or a year. The certification organization receives and encrypts the hash values of the blocks with its private key to generate encrypted hash values. The certification organization may publish the encrypted hash values and its public key to the general public. When a second company wants to verifies the delivery record of the first company, the second company obtains the public key from the certification organization and decrypts the encrypted hash values with the public key to obtain the retrieved hash values. By way of example, for verifying the delivery record of a certain period of the first company, which is stored in a specific block in the link of blocks, block 310 shows that the hash value of the specific block is sent to the certification organization for encryption with the private key. Block 320 shows that the second company obtains a retrieved hash value which corresponds to the hash value of the specific block of the first company by decryption with the public key. Block 330 shows the second company re-computes a re-computed hash value from a genesis block of the link of the blocks up to the specific block. Block 340 shows that the second company compares the re-computed hash value and the retrieved hash value. Block 350 shows the delivery record up to the specific block is truly non-modified if the values are the same. Block 360 shows the delivery record up to the specific block was changed if the values are different.

Figure 4:
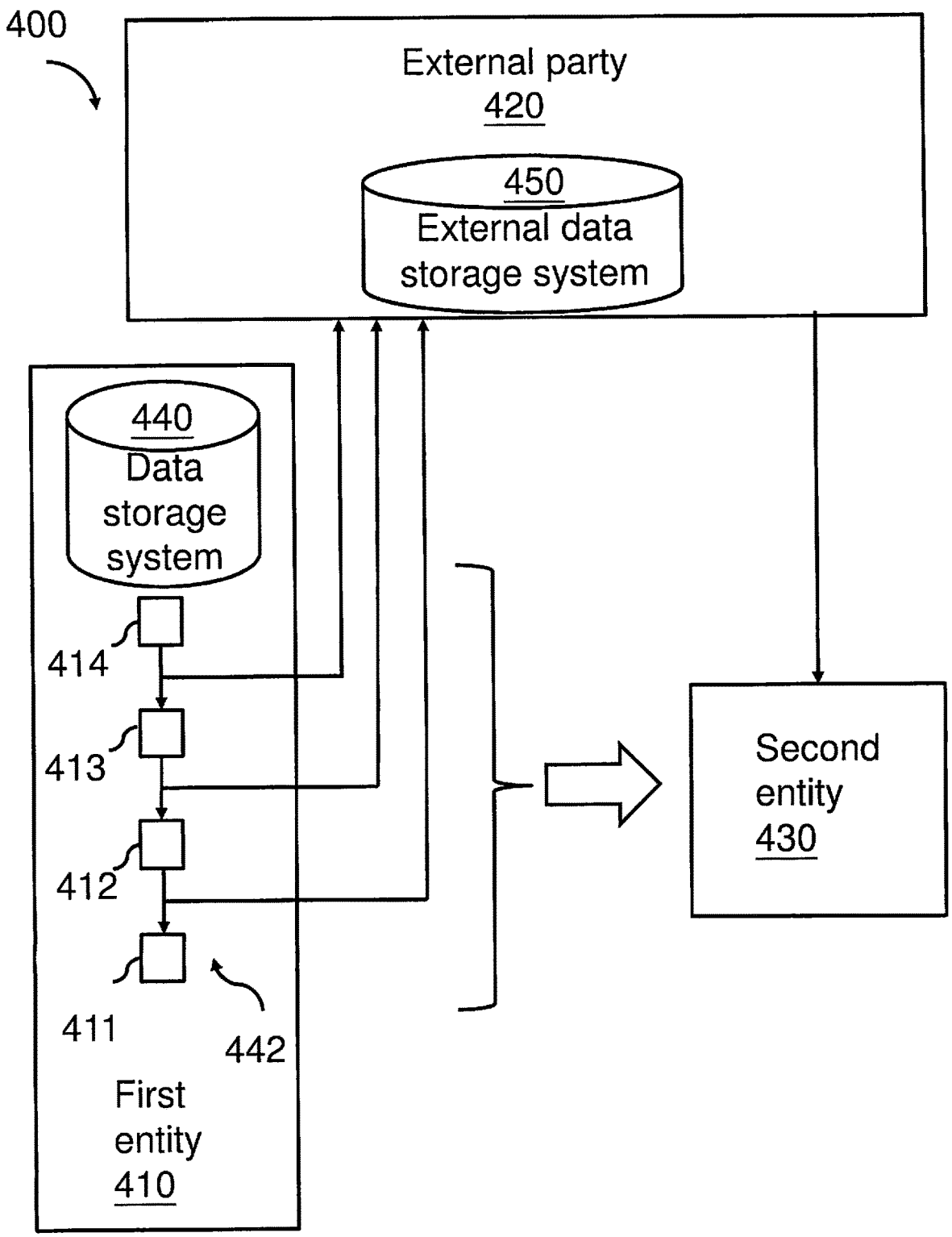
FIG. 4 shows a data authentication system in accordance with an example embodiment.

FIG. 4 shows a data authentication system 400 in accordance with an example embodiment. The data authentication system 400 proves digital records stored in a blockchain 442 in a first entity 410 are truly non-modified. The data authentication system 400 includes a data storage system 440, a processor (not shown) and a memory (not shown) storing instructions and in electronic communication with the processor in the first entity. The data storage system 440 stores the blockchain 442 in the first entity 410. The blockchain 442 includes a plurality of blocks 411, 412, 413, 414. Each of Blocks 412, 413, 414 has a hash pointer pointing to the previous block. Each hash pointer stores the hash value computed from the digital content of the previous block. The data authentication system 400 further includes an external data storage system 450 in the external party 420. The external data storage system 450 receives and stores the hash pointers of the blockchain 442 sent from the data storage system 440 in the first entity and allows a second entity 430 to obtain a retrieved hash pointer based on a key index. The key index corresponds to a block in the blockchain 442 in the first entity that the second entity wants to verify the digital records stored therein, namely a specific block. In this embodiment, the first entity sends hash pointers of blocks 412, 413 and 414 to the external party 420. Each of the hash pointers points to the previous block so the latest block that can be verified is block 413, as this is the block that hash pointer of block 414 points to. To verify the latest digital record, the processor is configured to execute the instructions to compute a re-computed hash value of block 413 in the first entity. The second entity 430 obtains a retrieved hash value which is the last hash pointer having the hash value of block 413 stored at the external party and compares it with the re-computed hash value of block 413. If the re-computed hash value of the block 413 is the same as the retrieved hash value, the record stored in the blockchain in the first entity is verified to be truly non-modified.

By way of example, the external data storage system 450 is selected from a group consisting of a trusted certification organization, a public blockchain, a permission blockchain, a publishing media, an immutable data storage system, a medium that the second entity can read the stored data such as newspaper, a mechanism that the second entity can read the stored data, and a system that the second entity can read the stored data, such as a public FTP or HTTP/HTTPS server.

By way of example, the external data system 450 publishes the hash pointers stored in the external data storage system to the general public.

By way of example, the external data system 450 requires a read permission from the second entity 430 to read the hash pointers stored in the external data storage system 450.

By way of example, the external data storage system 450 generates an encrypted hash pointer by encrypting the hash pointer of the blockchain sent from the data storage system 440 with a private key, and provides a public key for the second entity 430 to decrypt the encrypted hash pointer to produce the retrieved hash pointer.

By way of example, the external data storage system 450 generates a signed hash pointer by signing the hash pointer of the blockchain sent from the data storage system with a private key, and provides a public key for the second entity 430 to verify the signed hash pointer to produce the retrieved hash pointer.

Figure 5:
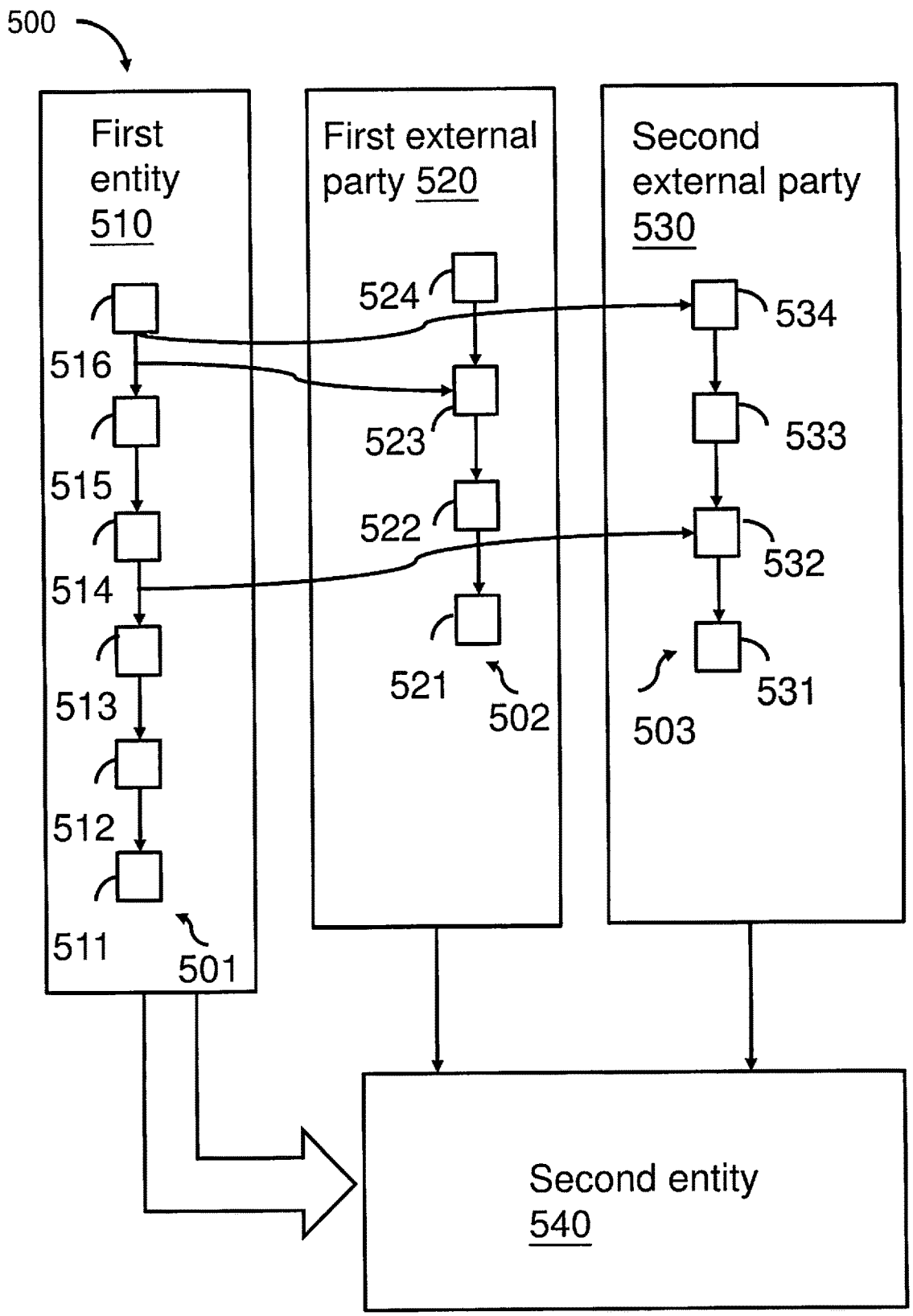
FIG. 5 shows a data authentication system in accordance with an example embodiment.

FIG. 5 shows an example embodiment that provides a system 500 for storing digital records in which the immutability is trackable. New digital records are generated day by day and are appended to a blockchain 501 in the first entity 510. Each block has a hash value computed from a content of the current block. The first entity 510 sends the hash values of the blockchain 501 to the first external party 520 periodically with a first predefined interval and to the second external party 530 with a second predefined interval. The first external party 520 holds a blockchain 502 and the second external party holds a blockchain 503. By way of example, the first entity 510 has stored the digital records in the blockchain 501 including blocks 511, 512, 513, 514, 515, 516. The first entity 510 has sent the hash value of block 513 to the second external party 530 and stored in the block 532 of the blockchain 503 in the second external party 530. The first entity 510 has sent the hash value of block 515 to the first external party 520 and to the second external party 530. The first external party 520 stores the hash value of block 515 in block 523 of its blockchain 502 while the second external party 530 stores the hash value of block 515 in block 534 of its blockchain 503. When a second entity 540 wants to verify the immutability of the digital records up to block 515, the second entity 540 retrieves the hash value stored in block 523 of the blockchain 502 in the first external party 520 and computes a re-computed hash value of the block 515 from the genesis block 511 of the blockchain 501 in the first entity 510. The second entity compares the re-computed hash value of the block 515 and the retrieved hash value of block 523 provided from the first external party 250. If their values are the same, the immutability of the digital records up to the block 515 in the first entity 510 is proved. Similarly, the second entity 540 can verify the immutability of the digital records up to block 515 in the first entity by retrieving the hash value stored in block 534 of the blockchain 503 in the second external party 530, and compares it with the re-computed hash value of the block 515 in the first entity 510, if their values are the same, the immutability of the digital records up to the block 515 in the first entity 510 is proved. In addition, if the second entity 540 has already verified the hash value stored in the block 513 is truly non-modified by finding that the re-computed hash value of block 513 computed in the first entity 510 agrees with the retrieved hash value stored in block 532 provided from the second external party 530, the second entity 540 does not necessarily compute the re-computed hash value of block 515 from the genesis block 511, but compute from the block 513, namely the intermediate block, onward in order to verify the immutability of block 515 in the first entity 510. In such way, the time and computation cost in the verification process are greatly reduced.

Also, the second entity 540 can compare the hash value stored in block 523 provided from the first external party 520 and the hash value stored in the block 534 provided from the second external party 530 to cross check the hash value of block 515 sent from the first entity 510. In such way, the data integrity of the first external party 520 and the second external party 530 can also be verified because if the values are not consistent, the second entity 540 can draw a conclusion that either the first external party 520 or the second external party 530 are untrusted parties. The second party can then reports this finding to all other parties in its blockchain system community and initiates further action.

Figure 6:
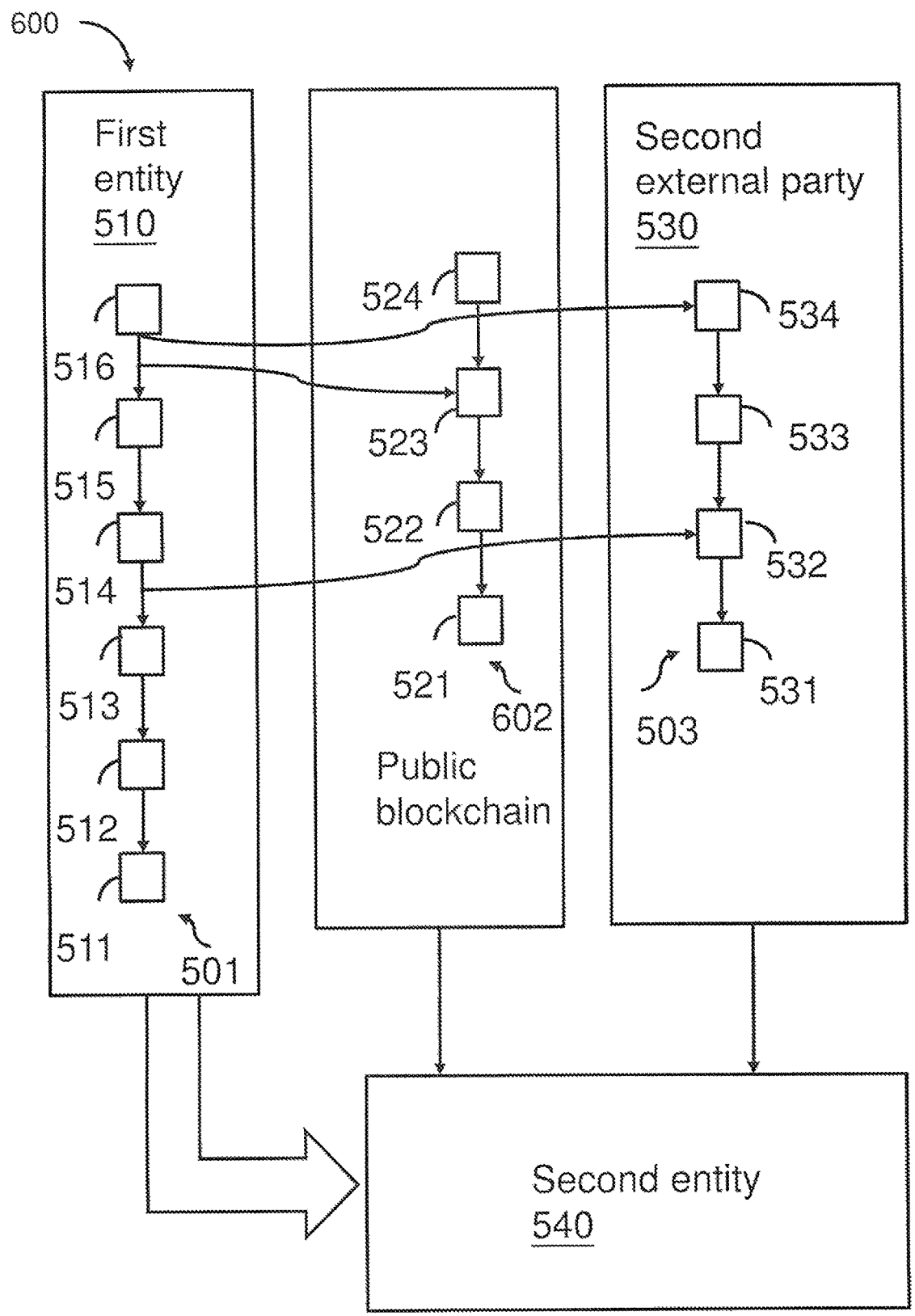
FIG. 6 shows a data authentication system in accordance with an example embodiment.

FIG. 6 shows another example embodiment that provides a system for storing digital records in which the non-modified history is provable. The reference characters used designate the same elements in FIG. 5, except the first external party is replaced by a public blockchain 602. In this example embodiment, the first entity regularly publishes the hash values of digital records to the general public by way of storing them in the public blockchain 602. As a result, the second entity 540 obtains the published hash values from the public blockchain 602 and verifies them with the hash values of the blocks in the sequence of block 501 in the first entity.

The system and method of the present disclosure may be implemented in the form of a software application running on a computer system. Further, portions of the methods may be executed on one such computer system, while the other portions are executed on one or more other such computer systems. Examples of the computer system include a mainframe, workstation, personal computer, handheld computer, and server, etc. The software application may be stored on a recording media locally accessible by the computer system and accessible via a hard wired or wireless connection to a network, for example, a local area network, or the Internet.

The computer system may include, for example, a processor, random access memory (RAM), a printer interface, a display unit, a local area network (LAN) data transmission controller, a LAN interface, a network controller, an internal bus, and one or more input devices, for example, a keyboard, mouse etc. The computer system can be connected to a data storage device.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the application software systems may be executed in a distributed computing environment. The software program and its related databases can be stored in a separate file server or database server and is transferred to the local host for execution. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, an application of the current method is described above as a method of verifying a transaction record stored in a first company, a method of verifying a delivery record in a first company, etc., but it is clear that other example embodiments may be applied. For example, the method can be implemented in the first company by organizing the chain of blocks by a program which sends the transaction records as update request to a key value store. The program regularly sends the hash values for the chain of blocks to three certification organizations. These three certification organizations independently sign the hash values with their own private keys and reply to the program the signed hash values. The second company or any external party can verify the signed hash values with the certifications' published public keys to provide the retrieved hash values. The second company can then verify the chain of blocks in the first company is truly non-modified by verifying the retrieved hash values with the hash values in the chain of blocks in the first company. Having three or more certification organizations can make sure that if one certification organization's private key is leaked, the method still works and can tolerate such cases.

The method disclosed in the present invention can also be applied to many other area. In another example embodiment related to relational database where a database transaction may involve a sequence of actions, write-ahead logging (WAL) techniques are used for providing atomicity and durability. The actions are first recorded in the log, which must be written to stable storage such as a disk before the actions are written to the database. The inventive ideas disclosed in this invention can be adapted to implement an efficient system to prove the immutability of the change history of the database whereby the write ahead log is organized and stored as a blockchain where the log entries are entries in the blockchain and certain number of entries are grouped to be a block. The blockchain and the hash pointers are regularly flushed to the disk. Hash pointers may be regularly stored or published to one or more third party organizations or systems or media or similar entity or systems. If there is a need to re-examine the log, one can re-compute the hash values of the blockchain and compare them with those retrieved from the disk, and one can decide up to which block in the chain the actions have been completed; and this information can be used to repair the data records accordingly. If there is a need to prove or verify the integrity and the database change history is truly immutable, one can re-compute the hash values of the blockchain and compare them with those retrieved from the third party systems or entities where the third party systems or entities can be another database, another private or permissioned or public blockchain or other media that the one verifying the immutability can access.

Also, there can be one database or similar data handling system reflecting the latest status of the data tracked in the sequence of blocks in the system shown in FIG. 5 in order to handle query requests or support verification during the write/update requests. The database or similar data handling system can provide various semantics and interfaces such as ACID semantics, SQL interface, loos consistency models, Key/Value store interfaces, and linear serializability consistency model, etc.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

For example, the hash values of the chain of blocks can be sent to a blockchain every day, to a certification organization for encryption every month and to another certification organization for signature every year.

What is claimed is:

1. A method of proving immutability of digital records in a first entity, comprising:
   storing, by the first entity, the digital records in a blockchain including a sequence of blocks, each block having a hash value computed from a content of a current block and all its previous blocks;
   regularly sending, by the first entity to at least one external party, at least one hash value;
   computing, by the first entity, a re-computed hash value for a specific block in response to a request to validate the specific block received from a second entity, wherein the re-computed hash value is computed based on contents of the sequence of blocks of the blockchain from a selected block of the sequence of blocks to the specific block;
   providing, by the first entity, the re-computed hash value to the second entity;
   obtaining, by the second entity, a retrieved hash value of the specific block from the at least one external party by mapping a key index, wherein the key index corresponds to the specific block in the sequence of blocks; and
   proving, by the second entity, that the digital records have not been changed up to the specific block if the re-computed hash value matches the retrieved hash value.

2. The method of claim 1 further comprising:
   storing, by the at least one external party, the at least one hash value sent from the first entity in a group consisting of a newspaper, a public blockchain and a permissive blockchain which can be read by a general public; and
   exposing, by the at least one external party, the at least one stored hash value to the general public.

3. The method of claim 1 further comprising:
   storing, by the at least one external party, the at least one hash value sent from the first entity in a permissive blockchain, wherein the at least one external party controls a read permission of the permissive blockchain.

4. The method of claim 1 further comprising:
encrypting, by the at least one external party, the at least one hash value with a private key to generate at least one encrypted hash value; and
decrypting the at least one encrypted hash value with a public key provided by the at least one external party to provide the retrieved hash value.

5. The method of claim 1 further comprising:
signing, by the at least one external party, the at least one hash value with a private key to generate at least one signed hash value; and
verifying the at least one signed hash value with a public key provided by the at least one external party to provide the retrieved hash value.

6. The method of claim 1, wherein the selected block is a genesis block of the sequence of blocks stored at the first entity.

7. The method of claim 1, wherein the selected block is an intermediate block of the sequence of blocks stored at the first entity, wherein the digital records have been proved to be truly non-modified up to the intermediate block, and wherein the intermediate block is a block between a genesis block and the specific block in the sequence of blocks.

8. A method of verifying digital records stored in a sequence of blocks in a first entity is truly non-modified, each block having a hash value computed from a content of a current block and all its previous blocks, comprising:
regularly sending, by the first entity to at least one external party, at least one hash value;
computing, by a second entity, a re-computed hash value of a specific block from the digital records stored at the first entity;
obtaining, by the second entity, a retrieved hash value of the specific block from a first external party and a second external party by mapping a key index, wherein the key index corresponds to the specific block in the sequence of blocks in the first entity;
evaluating, by the second entity, whether the first external party and the second external party are trustworthy entities based on comparing the retrieved hash value obtained from the first external party and the second external party; and
verifying, by the second entity, that the digital records are truly non-modified up to the specific block if the re-computed hash value is the same as the retrieved hash value obtained from a trustworthy entity.

9. The method of claim 8 further comprising:
storing, by the at least one external party, the at least one hash value sent from the first entity in a group consisting of a newspaper, a public blockchain and a permissive blockchain which can be read by a general public; and
exposing, by the at least one external party, the at least one stored hash value to the general public.

10. The method of claim 8 further comprising:
storing, by the at least one external party, the at least one hash value sent from the first entity in a permissive blockchain, wherein the at least one external party controls a read permission of the permissive blockchain.

11. The method of claim 8 further comprising:
encrypting, by the at least one external party, the at least one hash value with a private key to generate at least one encrypted hash value; and
decrypting the at least one encrypted hash value with a public key provided by the external party to provide the retrieved hash value.

12. The method of claim 8 further comprising:
signing, by the at least one external party, the at least one hash value with a private key to generate at least one signed hash value; and
verifying the at least one signed hash value with a public key provided by the external party to provide the retrieved hash value.

13. The method of claim 8, wherein the re-computed hash value of a specific block is computed from a genesis block of the sequence of blocks stored at the first entity.

14. The method of claim 8, wherein the re-computed hash value of a specific block is computed from an intermediate block of the sequence of blocks stored at the first entity, wherein the digital records have been proved to be truly non-modified up to the intermediate block, wherein the intermediate block is a block between a genesis block and the specific block in the sequence of blocks.

15. A data authentication system that proves digital records stored in a sequence of blocks of a blockchain of a first entity is truly non-modified, comprising:
a first data storage system of the first entity that stores the sequence of blocks of the blockchain, each block having a hash value computed from a content of a current block and all its previous blocks;
a processor; and
a memory in electronic communication with the processor and storing instructions, the processor being configured to execute the instructions to:
compute a re-computed hash value of a specific block from the digital records stored in the sequence of blocks stored at the first data storage system of the first entity,
retrieve a first hash value corresponding to the specific block from a first external data storage system of a first external party and a second hash value corresponding to the specific block from a second external data storage system of a second external party;
compare the first hash value and the second hash value; and
determine the digital records stored in the sequence of blocks in the first entity are truly non-modified if the re-computed hash value of the specific block is the same as the retrieved hash value retrieved from the first external party or the second external party; and
verify a trustworthiness of the first external party or the second external party based on a comparison of the first retrieved hash value and the second retrieved hash value.

16. The data authentication system of claim 15, wherein the first external data storage system is selected from a group consisting of a trusted certification organization, a public blockchain, a permission blockchain, a publishing media, an immutable data storage system, a medium that a second entity can read the stored data, a mechanism that the second entity can read the stored data, and a system that the second entity can read the stored data.

17. The data authentication system of claim 15, wherein the first external data system publishes at least one hash value stored in the first external data storage system to a general public.

18. The data authentication system of claim 15, wherein the first external data storage system generates at least one encrypted hash value by encrypting at least one hash value of the sequence of blocks sent from the first data storage system with a private key, and provides a public key for a second entity to decrypt the at least one encrypted hash value to provide the retrieved hash value.

19. The data authentication system of claim 15, wherein the external data storage system generates at least one signed hash value by signing the at least one hash value of the sequence of blocks sent from the data storage system with a private key, and provides a public key for a second entity to verify the at least one signed hash value to provide the retrieved first hash value.

20. The data authentication system of claim 15, wherein the first external data system requires a read permission from a second entity to read at least one hash value stored in the first external data storage system.

* * * * *